United States Patent [19]

Dlugos et al.

[11] 4,121,676
[45] Oct. 24, 1978

[54] METHOD OF REDUCING HYSTERESIS IN A SPRING SCALE

[75] Inventors: Daniel F. Dlugos, Huntington; John L. Lorenzo, Southbury, both of Conn.; Frederick J. Staudinger, North Salem, N.Y.; John F. Zettler, Stowe, Mass.

[73] Assignee: Pitney-Bowes, Inc., Stamford, Conn.

[21] Appl. No.: 859,821

[22] Filed: Dec. 12, 1977

[51] Int. Cl.² .................... G01G 3/00; G01L 5/12
[52] U.S. Cl. ..................................... 177/225; 177/1; 73/141 AB
[58] Field of Search ....... 177/1, 184, 210 R, 210 EM, 177/225–228, 230, DIG. 5; 73/141 AB

[56] References Cited

U.S. PATENT DOCUMENTS

| 2,419,217 | 4/1947 | Isenberg | 177/185 X |
| 2,681,566 | 6/1954 | Ruge | 177/225 UX |
| 3,788,134 | 1/1974 | Meier | 177/226 X |

Primary Examiner—George H. Miller, Jr.
Attorney, Agent, or Firm—Peter Vrahotes; William D. Soltow, Jr.; Albert W. Scribner

[57] ABSTRACT

A method of improving the accuracy of scale readings featuring exciting the molecules of the supporting spring and clamping structure of the scale. The purpose of this excitation is to reduce the effects of hysteresis, creep and drift upon the measured load. Exciting the molecules of the support spring causes the scale to reach its stable state of stress much more rapidly. This results in obtaining more accurate weight readings for a load being weighed.

5 Claims, 2 Drawing Figures

METHOD OF REDUCING HYSTERESIS IN A SPRING SCALE

This invention pertains to weighing scales, and more particularly to a method of improving the accuracy of a spring supported weighing scale.

BACKGROUND OF THE INVENTION

Heretofore, weighing scales using support springs have experienced inaccuracies due to the molecular effects of the spring materials and clamping structure. It has been observed, that when a scale deflects under a load to be weighed a stable state of stress is not quickly achieved due to the effects of hysteresis, creep, and drift. These effects do not produce large errors in the weight readings and therefore, nothing has been done in the design of scales to compensate for them.

Where high accuracy is not a criteria, the aforementioned molecular effects and their attendant errors do not generally present a problem. These molecular effects do not generally present a problem. These molecular effects can no longer be ignored however, because scale standards have now reached requirements of extreme accuracy.

Usually, in any design, hysteresis, creep and drift are treated by means of prevention, i.e. a proper choice of materials is made to reduce (but not eliminate) these effects.

This invention is concerned with the elimination of molecular effects in the load support springs of scales as a means of providing more accurate weight readings.

SUMMARY OF THE INVENTION

This invention relates to a method of increasing the accuracy of weighing scales using support springs in their design. The weight readings of these scales are improved by substantially reducing or eliminating the molecular effects causing hysteresis, creep and/or drift. The molecules of the support spring and clamping structure are excited by inducing a varying ultrasonic field in the spring. When a load to be weighed is supported upon the spring, the spring and its associated clamping structure will reach a stable state of stress more quickly as a result of this excitation. This will result in providing a more accurate weight reading.

An alternate embodiment of the above method comprises the use of inducing a varying magnetic field in the support spring and clamping structure.

It is an object of the invention to provide an improved weighing scale;

It is another object of the invention to provide a weighing scale of improved accuracy;

It is a further object of this invention to excite the supported springs of weighing scales in order to achieve a more rapid approach to a stable state of stress;

These and other objects of the invention will become more apparent and will be better understood with reference to the following detailed description taken in conjunction with the accompanying drawings, in which.

DETAILED DESCRIPTION

Figure 1:
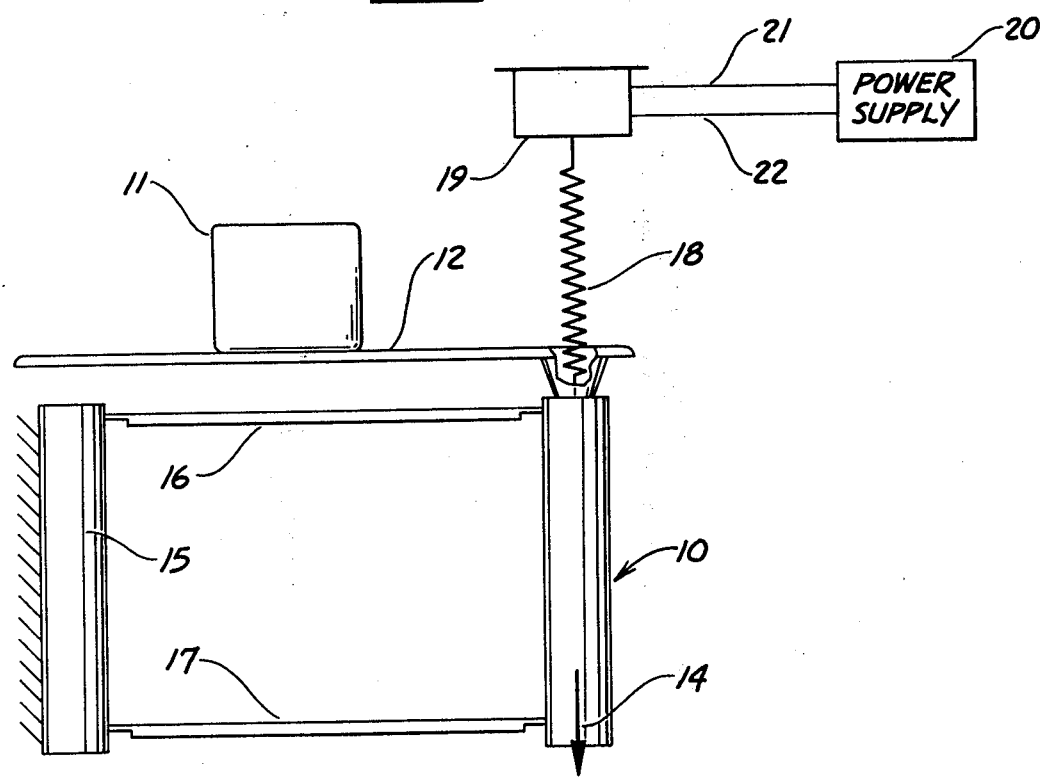
FIG. 1 is a schematic view of a first embodiment of tthis invention.

Referring to FIG. 1, a deflectible load support member for a weighing scale is generally depicted by arrow 10. A load 11 to be weighed is placed upon a weighing platform or pan 12 of the scale. The pan 12 is connected to the deflectible load support member 10, and causes the load support 10 to deflect in response to weight 11 is shown by arrow 14.

The load support member 10 is attached to a stationary frame member 15 by means of two pivot arms 16 and 17, respectively.

A spring 18 substantially supports the deflectible member 10, and provides a substantially linear movement for the support member necessary to produce accurate weight readings.

An ultrasonic transducer 19 is attached to spring 18 at its other end, as illustrated.

An oscillating voltage power supply 20 is connected to the transducer 19 via lines 21 and 22, respectively.

As the deflectible member 10 moves (arrow 14) under the influence of weight 11, an optical detector (not shown) converts the measured deflection into weight readings.

In standard scales not employing the invention, the spring 18 will usually not reach a stable state of stress in the required time to provide an accurate weight reading.

The invention seeks to eliminate this problem by substantially reducing or eliminating the molecular effects in the spring 18 and its associated clamping structure causing this condition. The molecular effects referred to are ones that cause hysteresis, creep or drift. As aforementioned, it is these effects that prevent the rapid attainment of a steady state condition, which in turn interferes with the accuracy of observed weight readings.

OPERATION OF THE INVENTION

The present invention substantially reduces or eliminates the molecular effects in the spring 18 by inducing an oscillating ultrasonic field therein. This field excites the molecules in the spring 18, which tends to eliminate the hysteresis, creep or drift conditions.

The induced oscillating field is caused by the oscillating voltage power supply 20 which feeds the ultrasonic transducer 19. The transducer 19 being connected to the spring 18, continuously excites the spring molecules. Thus, as the spring 18 is put in tension by the deflection of member 10, the excitation of the induced field will allow the spring to more quickly reach a stable state of stress. This in turn will provide for more accuracy in the weight readings.

ALTERNATE EMBODIMENT

Figure 2:
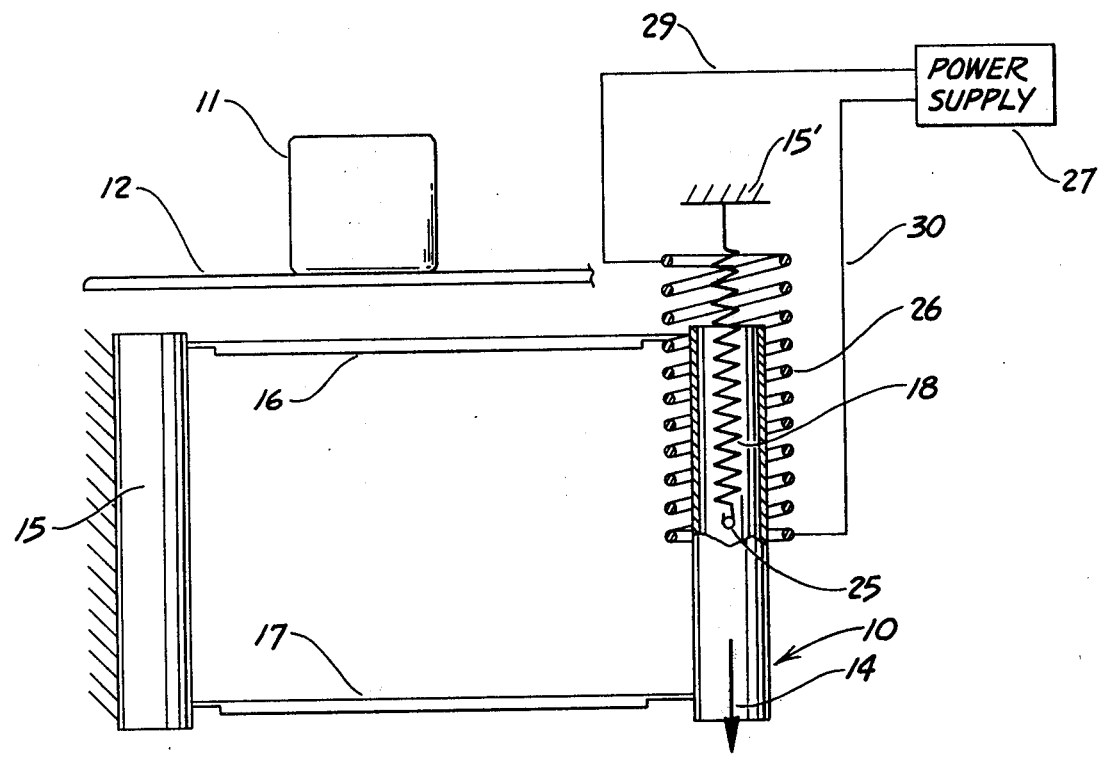
FIG. 2 is a schematic view of a second embodiment of this invention.

Now referring to FIG. 2, an alterate embodiment of the invention is shown. Like designations refer to similar parts, components, and operations, for the sake of brevity.

Deflectable member 10 is now made hollow as illustrated by the cut-away view, such that spring 18 fits inside and attaches to member 10 via pin 25. Spring 10 can be made of material which is easily magnetizable if so desired. An electromagnetic coil 26 is constructed to surround the spring 18 and its associated clamping structure. The spring 18 is now supported by the frame 15'. The coil 26 is fed with an oscillating current from power supply 27 via lines 29 and 30, respectively.

The alternate embodiment of FIG. 2 operates in a similar fashion to the embodiment of FIG. 1. The spring 18 of FIG. 2 has its molecules excited by an induced oscillating magnetic field created by the coil 26. The induced oscillating field is created by feeding the oscillating current from power supply 27 into the electromagnetic coil 26. This oscillating field is induced in the spring 18 and its clamping structure. Thus, as the spring 18 is put in tension by the deflecting member 10 in response to weight 11, the excitation of the induced field will allow the spring to more quickly reach a stable state of stress. This in turn will provide for more accurate weight readings. The induced magnetic field in the spring will excite the molecules in like fashion to that of the ultrasonic field.

It is to be understood that many modifications can be made in the design of this invention consistent with the knowledge available to those skilled in this art. Such changes are deemed to be within those limits circumscribed for this invention by the appended claims. Having described the invention, what is desired to be covered by Letters Patent is as follows:

What is claimed is:

1. A method of reducing the molecular effects causing hysteresis, creep and/or drift of a spring means used for supporting a load in a weighing scale, said method being practiced for the purpose of obtaining more accurate weight readings, said method comprising the steps of:
    creating a varying magnetic field; and
    inducing said varying magnetic field in said spring means for causing said spring means to reach a stable state of stress more quickly in response to said load being weighed upon said weighing scale and being supported by said spring means, whereby a more accurate weight reading will be obtained for said load.

2. The method of claim 1, wherein said spring means comprises a spring of magnetizable material.

3. The method of claim 1, wherein said spring means comprises a supporting spring and its associated clamping structure.

4. A method of reducing the molecular effects causing hysteresis, creep and/or drift of a spring means used for supporting a load in a weighing scale, said method being practiced for the purpose of obtaining more accurate weight readings, said method comprising the steps of:
    creating a varying ultrasonic field; and
    inducing said varying ultrasonic field in said spring means for causing said spring means to reach a stable state of stress more quickly in response to said load being weighed upon said weighing scale and being supported by said spring means, whereby a more accurate weight reading will be obtained for said load.

5. The method of claim 4, wherein said spring means comprises a supporting spring and its associated clamping structure.

* * * * *